United States Patent
Sinha et al.

(10) Patent No.: US 8,404,293 B2
(45) Date of Patent: Mar. 26, 2013

(54) METHOD FOR SEPARATING AND CONCENTRATING BIOACTIVE PHENOLICS

(75) Inventors: Nirmal K. Sinha, Frankfort, MI (US); Meena Sinha, Frankfort, MI (US)

(73) Assignee: Graceland Fruit, Inc., Frankfort, MI (US)

(*) Notice: Subject to any disclaimer, the term of this patent is extended or adjusted under 35 U.S.C. 154(b) by 301 days.

(21) Appl. No.: 12/889,109

(22) Filed: Sep. 23, 2010

(65) Prior Publication Data
US 2012/0076904 A1  Mar. 29, 2012

(51) Int. Cl.
*A23L 2/04* (2006.01)

(52) U.S. Cl. ............ 426/430; 426/431

(58) Field of Classification Search .......... 426/431, 426/430
See application file for complete search history.

(56) References Cited

U.S. PATENT DOCUMENTS

| | | | |
|---|---|---|---|
| 4,500,517 A * | 2/1985 | Luss | 424/711 |
| 4,889,921 A * | 12/1989 | Diosady et al. | 530/377 |
| 5,086,166 A * | 2/1992 | Lawhon et al. | 530/378 |
| 5,164,212 A * | 11/1992 | Nafisi-Novaghar et al. | 426/250 |
| 5,702,752 A * | 12/1997 | Gugger et al. | 426/634 |
| 5,792,503 A * | 8/1998 | Gugger et al. | 426/634 |
| 5,912,363 A * | 6/1999 | Nafisi-Movaghar et al. | 549/399 |
| 6,033,714 A * | 3/2000 | Gugger et al. | 426/634 |
| 6,171,638 B1 * | 1/2001 | Gugger et al. | 426/634 |
| 6,313,273 B1 * | 11/2001 | Thomas et al. | 530/378 |
| 6,565,912 B1 * | 5/2003 | Gugger et al. | 426/634 |
| 7,090,885 B2 * | 8/2006 | Singh | 426/598 |
| 7,306,821 B2 * | 12/2007 | Singh | 426/656 |
| 7,678,392 B2 * | 3/2010 | Green et al. | 424/725 |
| 8,048,463 B2 * | 11/2011 | Diosady et al. | 426/481 |
| 8,263,162 B2 * | 9/2012 | West et al. | 426/548 |
| 2003/0108493 A1 * | 6/2003 | Henry et al. | 424/59 |
| 2005/0191268 A1 * | 9/2005 | Henry et al. | 424/74 |
| 2007/0237877 A1 * | 10/2007 | Diosady et al. | 426/598 |
| 2009/0035432 A1 * | 2/2009 | Mantius et al. | 426/430 |
| 2010/0234569 A1 * | 9/2010 | Helling et al. | 530/350 |
| 2011/0028427 A1 * | 2/2011 | McManus | 514/54 |
| 2011/0165309 A1 * | 7/2011 | Medina et al. | 426/599 |

OTHER PUBLICATIONS

KOCH Membrane System Information Sheet. 2011. Includes Model 3838-K328-NYVT.*

* cited by examiner

*Primary Examiner* — Anthony Weier
(74) *Attorney, Agent, or Firm* — Mitchell Intellectual Property Law, PLLC

(57) ABSTRACT

A method for physical separation and purification of bioactive phenolics from fruits, berries and vegetables by subjecting a fruit, berry or vegetable extract solution having a Brix of from about 1 to about 4 to ultrafiltration using an about 2,000-6,000 Dalton cutoff ultrafiltration membrane under a pressure of about 30-120 psi, and a temperature of about 80-110° F. This is followed by subjecting the resulting retentate to diafiltration-ultrafiltration with the addition of water, using an about 2,000-6,000 Dalton cutoff ultrafiltration membrane under a pressure of about 30-120 psi, and a temperature of about 80-110° F., and recovering the diafiltered retentate or the bioactive phenolic containing solids thereof.

30 Claims, 1 Drawing Sheet

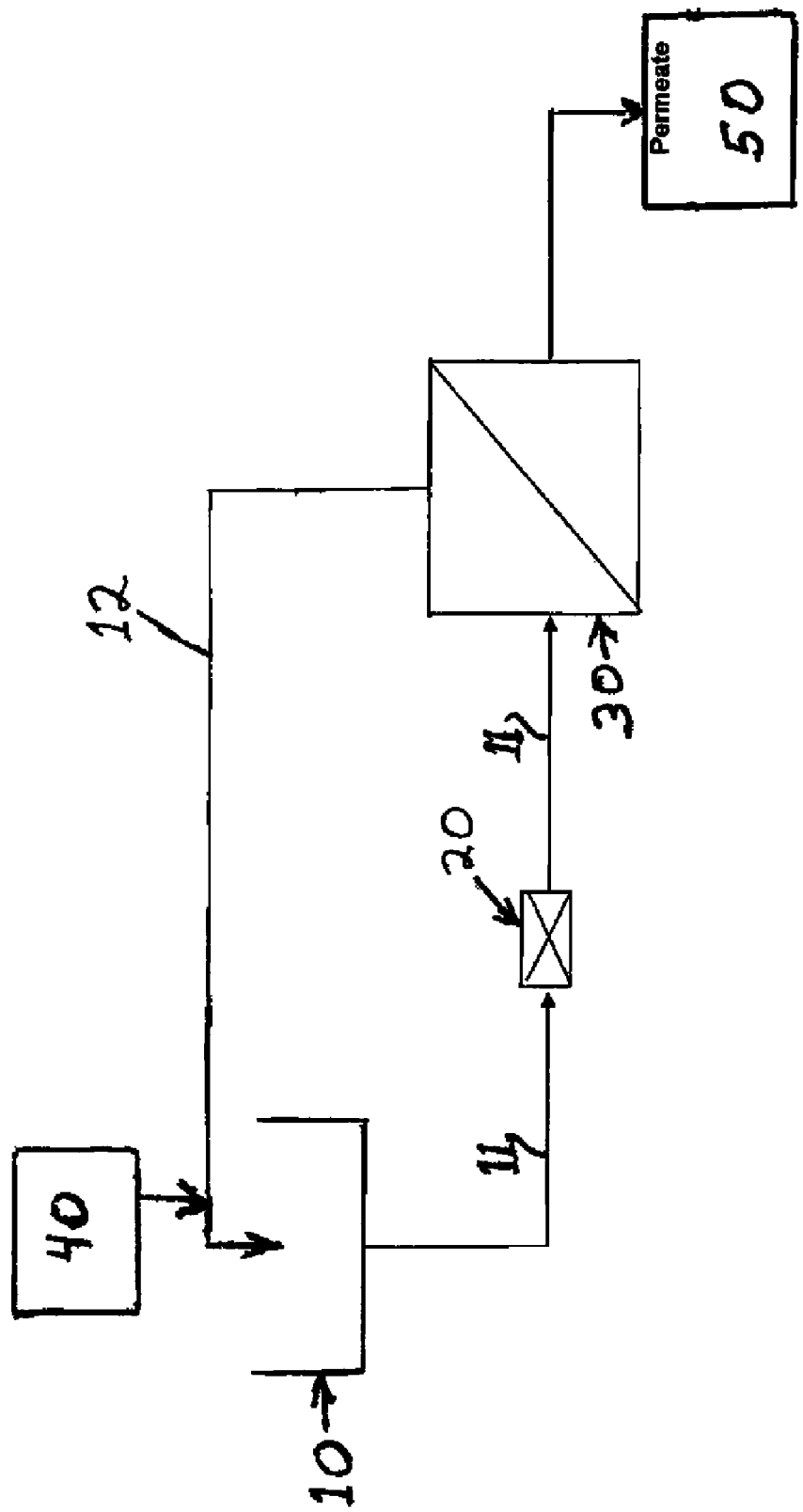

METHOD FOR SEPARATING AND CONCENTRATING BIOACTIVE PHENOLICS

FIELD OF THE INVENTION

The present invention relates to the field of physical separation, concentration and drying of bioactive color fraction containing anthocyanins and phenolics from the juices of berries, fruits and vegetables.

BACKGROUND

In addition to vitamins, minerals, fibers and energy giving nutrients like sugar, carbohydrates, lipids and proteins, fruits and vegetables contain bioactive phenolic and polyphenolic compounds which are not energy giving nutrients, but which are believed to have beneficial physiological and cellular roles, and modify risk of chronic diseases. Consumed over an extended period as a part of a regular diet, these naturally occurring bioactive phenolic and polyphenolic plant constituents can confer a wide range of physiological benefits as natural antioxidants, antiallergic, anticarcinogenic, antiinflammatory, etc.

The phenolic and polyphenolic compounds of dietary significance are polycyclic structures consisting of 15 carbon atoms based on C6-C3-C6 skeleton, and include:
  a) Flavonols (e.g. quercetin in apples, cherries)
  b) Flavones (e.g. apigenin in celery)
  c) Flavan-3-ols (e.g. proanthocyanidin A or PAC in cranberries having antiadhesion role)
  d) Flavanones (e.g. naringenin in citrus),
  e) Anthocyanins (color pigments of fruits, vegetables and flowers)
  f) Isoflavones (present in soy products)

The non-flavonoid polyphenolic compounds having dietary significance include:
  a) The C6-C1 Phenolic acids (e.g. gallic acid, ellagic acid in raspberries)
  b) The C6-C3 Hydroxy cinnamates (e.g. chlorogenic acid in cherries)
  c) The C6-C2-C3 Stilbene (e.g. resveratrol in red wine, pterostilbene in blueberries)

In nature phenolic compounds are commonly found conjugated to sugars and organic acids, and have antioxidant properties as determined by their oxygen Radical Absorbance Capacity (ORAC). The in vitro ORAC test was developed as a relative measure of antioxidant capacity. Fruits and vegetables products rich in health promoting constituents have many benefits and uses including as dietary supplements.

The essentially water soluble anthocyanins are a significant component of some fruits, vegetables and flowers, and bestow them with their red, blue and purple colors. The known anthocyanins exist as the glucosides of polyhydroxy and/or polymethoxy derivatives of the flavylium cation like, cyanidin (red color), pelargonidin (orange-red), peonidin (red-rose), delphinidin (blue-violet), petunidin (blue-purple) and malvidin (purple). Anthocyanins in red tart cherries have been suggested to benefit people suffering from joint pain and inflammation because of their potential role in inhibiting cyclooxygenase enzymes (Cox-1 and Cox-2) which are reported to catalyze the conversion of arachidonic acid to prostaglandins (PGs) which contribute to pathogenesis of inflammation. In rheumatoid arthritis and other inflammatory joint diseases, high concentration of PGs has been detected.

The molecular weight of these bioactive phenolic compounds can range from about 300 to about 700 Daltons. Sugars such as glucose and fructose ($C_6H_{12}O_6$) which are the predominant components of fruit juices have molecular weight of 180 Dalton; the fruit juices also contain a small amount of sucrose ($C_{12}H_{22}O_{11}$) having a molecular weight of 342 Dalton. The organic acids (such as citric acid, $C_6H_8O_7$; malic acid $C_4H_6O_5$, tartaric acid, $C_4H_6O_6$, quinic acid, $C_7H_{12}O_6$) in fruits juices can range in molecular weight from 134 to 192 Dalton. Resin separators and high pressure liquid chromatography have been used, but these are chemical processes and often not as economically viable for commercial scale up in separation of bioactive flavanoids from the sugars and food acids of the juices.

SUMMARY OF THE INVENTION

The present invention is a method for physical separation and purification of bioactive phenolics from fruits, berries and vegetables by subjecting a fruit, berry or vegetable extract solution having a Brix of from about 1 to about 4 to ultrafiltration using an about 2,000-6,000 Dalton cutoff ultrafiltration membrane under a pressure of about 30-120 psi, and a temperature of about 80-110° F., followed by subjecting the resulting retentate to diafiltration-ultrafiltration with the co-injection of water, using an about 2,000-6,000 Dalton cutoff ultrafiltration membrane under a pressure of about 30-120 psi, and a temperature of about 80-110° F., and recovering the diafiltered retentate containing the separated bioactive phenolics.

The presence of the bioactive phenolics in the retentate is evident from the analysis of the freeze dried product prepared from the retentate. It is surprising that the bioactive phenolics, which have molecular weights of less than a thousand, are captured and concentrated in the retentate, using specific higher molecular weight cut off membranes.

BRIEF DESCRIPTION OF THE DRAWINGS

FIG. 1 is a schematic showing of apparatus used in the process.

DESCRIPTION OF THE PREFERRED EMBODIMENTS

In the preferred embodiment, the process comprises the following steps:

1. The input feed is prepared by holding the fruit, berries or vegetables in two to four times their volume of water at 80-130° F. for 30 mins to 3 hours, separating the fruit soluble solids from the extracted aqueous solution, adding enzymes to the extracted solution to clarify it, pressure filtering out sediments and particles from the solution, and microfiltering the solution. The resulting solution is about 1-4 Brix.
2. The 1-4 Brix extract solution is then ultrafiltered, with recirculation of the retentate, through two about 2,000-6,000 Dalton, preferably about 4000-6000 Dalton, and most preferably about 5,000 Dalton molecular weight cutoff tight spiral wound polyethersulfone (PES) ultrafiltration membranes used in parallel at about 80 to about 110° F., preferably about 100 to about 110° F., under a pressure of from about 45 to about 120 psi (higher for cranberry juice, lower for other juices). (FIG. 1) This removed about 65% or more of the soluble solids, which comprise sugars, organic acids and other dissolved solids, from the extracted solution. The permeate thus contains primarily sugar and food acids, and the retentate contains the color fraction containing primarily the bioactive anthocyanins and other phenolics.

3. The retentate color fraction containing the bioactive anthocyanins and phenolics is then purified by ultrafiltration-diafiltration step by repeatedly passing the retentate fraction through the same 4,000-6,000 Dalton, spiral wound membranes, or preferably through 2,000-4,000, most preferably about 3,000 Dalton spiral wound membranes, with added distilled water. As in the initial ultrafiltration step, this diafiltration process is conducted at about 80 to about 110° F., preferably about 100 to about 110° F., under a pressure of from about 45 to about 120 psi (higher for cranberry juice, lower for other juices). The water is added to the retentate stream at a rate of about one quarter to about one half liter of water per liter of retentate. The retentate is recirculated with dilution as indicated until the total distilled water used is about 1 and ½ to about 3 times the volume of the original retentate.

The resulting anthocyanins and phenolic concentrated retentate can be used a high antioxidant product, or as a phenolic concentrated product, or can be freeze dried at about 26° F.

Step 1 is a juice extraction and clarification step. One obtains a clarified, extracted juice within about 1 to about 4 Brix range. The Brix of the "as extracted" juice can be adjusted by further concentration, or dilution, as necessary.

In the ultrafiltration step (step 2 above), extracted, clarified juice held in a feed reservoir 10 is pumped by pump 20 through feed line 11, to ultrafiltration unit 30. (FIG. 1). As noted above, ultrafiltration unit 30 comprises two 4,000-6,000 Dalton, preferably about 5,000 Dalton molecular weight cutoff tight spiral wound polyethersulfone (PES) ultrafiltration membranes used in parallel. The pressure used in ultrafiltration in step 2 will vary somewhat with the extracted juice being ultra-filtered. Preferably about 30 to about 60 psi is used for most juices. Higher pressures are used for cranberry juice, preferably about 60 to about 120 psi. The temperature at which the juice is ultra-filtered is about 80 to about 110° F., preferably about 100 to about 110° F.

The retentate from ultrafiltration unit 30 recirculated through recirculation line 12 to feed reservoir 10, from which it is again pumped by pump 20, along with added original feedstock, to ultrafiltration unit 30. The permeate passing through ultrafiltration unit 30 is collected in a permeate receiver 50, and subsequently processed. When the flow rate through ultrafiltration unit 30 slows to about 4 liters per square meter of membrane area per hour or 4.0 LMH, recirculation is stopped.

The reservoir 10 then contains essentially retentate (probably with some small amount of original feed stock), in a volume from about ¹⁄₁₂ to about ¹⁄₂₂ of the volume of original feed stock processed. This is reflected in examples 1 to 3 below as the "volume concentration factor," which is the volume of original feedstock processed divided by the final volume of retentate obtained. A desirable volume concentration factor is thus from about 12 to about 22.

With the flow rate thus reduced, the ultrafiltration-diafiltration step (step 3 above) is initiated by stopping the flow of original feedstock into feed reservoir 10. Retentate only, with whatever small amount of original feed stock may be present, is pumped and recirculated through filter unit 30 by pump 20, with water from source 40 being co-injected to the retentate stream. Water is added at a rate of about one quarter to about one half liter of water per liter of retentate. The retentate is recirculated with dilution as indicated until the total distilled water used is about 1 and ½ to about 3 times the volume of the original retentate.

The filter membrane may be either cleaned or replaced prior to initiating the ultrafiltration-diafiltration step. One of the advantages of ultrafiltration diafiltration at this point is that it is not necessary to do either of the above as the diafiltration process minimizes membrane fouling, while further separating sugars and food acids into the permeate, and further concentrating anthocyanins and other phenolics into the retentate.

Nevertheless in one embodiment of the invention, the two 4,000-6,000 Dalton cutoff filter membranes are replaced with two 2,000-4,000 Dalton, preferably about 3000 Dalton molecular weight cutoff tight spiral wound polyethersulfone (PES) ultrafiltration membranes used in parallel, prior to initiating the recirculation/dilution process.

Examples 1-3 below show the results obtained using the process of the preferred embodiment on the extraction of red tart cherry juice, wild blueberry juice and cranberry juice.

Example 1

Physical Process Based on Ultrafiltration-Diafiltration (UF) for Fractionation of Bioactive Components from Red Tart Cherry (*Prunus cerasus*)

| Parameters and Analyses | Experimental and Analytical data |
|---|---|
| I. Input Feed: Water extract | |
| a. Volumes used (liters) | 1264.00 |
| b. Brix | 2.00 |
| c. Calculated soluble solids | 25.28 |
| II. Operating parameters | |
| a. Pressure (psi) | 45.0 |
| b. Temperature (° F.) | 108 |
| III. Ultrafiltration (UF) | |
| A. Bioactive Retentate (Color fraction) | |
| a. Volumes of retentate collected (liters) | 71.00 |
| b. Brix of retentate | 5.00 |
| c. Calculated soluble solids | 3.55 |
| d. Calculated % soluble solids of the input feed | 14.04 |
| e. Volume concentration factor (VCF) | 17.80 |
| B. Permeate (Sugar and Organic acid fraction) | |
| a. Volumes of permeate generated (liters) | 1193.0 |
| b. Brix of permeate | 1.82 |
| c. Calculated soluble solids | 21.73 |
| d. Calculated % soluble solids of feed passed in permeate | 85.96 |
| IV. Ultrafiltration-Diafiltration (UF-DF) of Retentate (Color fraction) from step III A | |
| IVA. Bioactive Retentate (color fraction) data | |
| a. Volumes of distilled water co-injected with retentate as a diafiltration liquid (liters) | 160.0 |
| b. Volumes of final bioactive retentate collected (liters) | 60.00 |
| c. Brix of retentate | 2.10 |
| d. Calculated soluble solids | 1.26 |
| d. Calculated % soluble solids of the input feed | 4.98 |
| e. Volume concentration factor (VCF) | 21.07 |
| IVB. Permeate Sugar and Organic acid fraction) data | |
| a. Volumes of permeate generated (liters) | 171.0 |
| b. Brix of permeate | 0.4 |

-continued

| Parameters and Analyses | Experimental and Analytical data |
|---|---|
| c. Calculated soluble solids | 0.684 |
| d. Calculated % soluble solids of feed passed in permeate | 2.71 |
| e. Total % soluble solids removed in the permeate | 88.66 |
| V. Freeze-drying of Bioactive color retentate obtained from UF-DF process as in IVA | |
| Weight of rentate used for drying (grams) | 1220.90 |
| Weight of freeze dried bioactive red tart cherry powder obtained | 23.70 |
| % Dried yield | 1.94 |
| VI. Analysis of anthocyanins, phenolics, antioxidant capacity and other markers of bioactivity in the freeze dried powder from step V. | |
| Total phenolics in the bioactive powder (g/100 g as Gallic acid equivalent) | 40.79 |
| Total Anthocyanins (g/100 g) | 9.27 |
| Total antioxidant capacity (ORAC value as micromol of Trolox/100 g) | 374,450 |
| Proanthocyanidins (g/100 g | 2.116 |
| Melatonin (microgram/100 g) | 0.216 |
| Cox-1 inhibition (mg/100 g) Based on assay kit from Invitrogen | 206.8 |
| Cox-2 inhibition (mg/100 g) | 152.9 |
| VII. Important anthocyanins in freeze dried red tart cherry powder from Step V analyzed | |
| Cyanidin (mg/100 g) | 710.8 |
| Cyanidin-3-O-glucoside (mg/100 g) | 2770.6 |
| Cyanidin3-O-galactoside (mg/100 g) | 419.7 |
| Cyanidin-3-O-arabinoside (mg/100 g) | 308.2 |
| Cyanidin-3-O-rutinoside (mg/100 g) | 118.2 |
| Petunidin-3-O-glucoside (mg/100 g) | 401.9 |
| Petunidin-3-O-glactoside (mg/100 g) | 310.7 |
| Petunidin-3-O-arabinoside (mg/100 g) | 103.0 |
| Petunidin (mg/100 g) | 78.4 |
| Peonidin-3-O-glucoside (mg/100 g) | 323.4 |
| Peonidin-3-O-glactoside (mg/100 g) | 58.80 |
| Peonidin (mg/100 g) | 25.15 |

Example 2

Physical Process Based on Ultrafiltration-Diafiltration for Fractionation of Bioactive Components from Wild Blueberries (*Vaccinium angustifolium*)

| Parameters and Analyses | Experimental and Analytical data |
|---|---|
| I. Input Feed: Water extract | |
| a. Volumes used (liters) | 805.00 |
| b. Brix | 2.00 |
| c. Calculated soluble solids | 16.10 |
| II. Operating parameters | |
| a. Pressure (psi) | 45.00 |
| b. Temperature (° F.) | 83.0 to 110.0 |
| III. Ultrafiltration (UF) IIIA. Bioactive Retentate (Color fraction) | |
| a. Volumes of retentate collected (liters) | 37.00 |
| b. Brix of retentate | 5.60 |
| c. Calculated soluble solids | 2.07 |
| d. Calculated % soluble solids of the input feed | 12.87 |
| e. Volume concentration factor (VCF) | 21.76 |
| IIIB. Permeate (Sugar and Organic acid fraction) | |
| a. Volume of permeate generated (liters) | 768.00 |
| b. Brix of permeate | 2.50 |
| c. Calculated soluble solids | 14.03 |
| d. Calculated % soluble solids of feed passed in permeate | 87.13 |
| IV. Ultrafiltration-Diafiltration (UF-DF) of Retentate (Color fraction) from III A IVA. Bioactive Retentate Color Fraction) data | |
| a. Volumes of distilled water co-injected with retentate as a diafiltration liquid (liters) | 120.00 |
| b. Volumes of retentate collected (liters) | 37.00 |
| c. Brix of retentate | 2.40 |
| d. Calculated soluble solids | 0.89 |
| d. Calculated % soluble solids of the input feed | 5.52 |
| e. Volume concentration factor (VCF) | 21.76 |
| IVB. Permeate (sugar and organic acid fraction) data: | |
| a. Volumes of permeate generated (liters) | 140.00 |
| b. Brix of permeate | 0.30 |
| c. Calculated soluble solids | 0.42 |
| d. Calculated % soluble solids of feed passed in permeate | 2.61 |
| e. Total % soluble solids removed in the permeate | 89.74 |
| V. Freeze-drying of Bioactive color retentate obtained from UF-DF process in III A | |
| Weight of rentate used for drying (grams) | 1023.70 |
| Weight of freeze dried bioactive wild blueberry powder obtained | 14.10 |
| % Dried yield | 1.38 |
| VI. Analysis of anthocyanins, phenolics, antioxidant capacity and other markers of bioactivity | |
| Total phenolics in the bioactive powder (g/100 g as Gallic acid equivalent) | 36.08 |
| Total Anthocyanins (g/100 g) | 14.19 |
| Total antioxidant capacity (ORAC value as micromol of Trolox/100 g) | 389,700 |
| Proanthocyanidins (g/100 g | 1.663 |

Example 3

Physical Process Based on Ultrafiltration-Diafiltration for Fractionation of Bioactive Components from American Cranberries (*Vaccinium macrocarpon*)

| Parameters and Analyses | Experimental and Analytical data |
|---|---|
| I. Input Feed: Water extract | |
| a. Volumes used (liters) | 720.00 |
| b. Brix | 2.00 |
| c. Calculated soluble solids | 14.40 |
| II. Operating parameters | |
| a. Pressure (psi) | 100.00 |

| Parameters and Analyses | Experimental and Analytical data |
|---|---|
| b. Temperature (° F.) | 106.0 to 110.0 |
| III. Ultrafiltration (UF) | |
| A. Bioactive Retentate (Color fraction) | |
| a. Volumes of retentate collected (liters) | 52.00 |
| b. Brix of retentate | 8.60 |
| c. Calculated soluble solids | 4.47 |
| d. Calculated % soluble solids of the input feed | 31.06 |
| e. Volume concentration factor (VCF) | 13.85 |
| B. Permeate (Sugar and Organic acid fraction) | |
| a. Volumes of permeate generated (liters) | 668.0 |
| b. Brix of permeate | 3.40 |
| c. Calculated soluble solids | 9.93 |
| d. Calculated % soluble solids of feed passed in permeate | 68.94 |
| IV. Ultrafiltration-Diafiltration (UF-DF) of Retentate (Color fraction) from step III A | |
| IVA. Bioactive Retentate Color Fraction) data | |
| a. Volumes of distilled water co-injected with retentate as a diafiltration liquid (liters) | 80.00 |
| b. Volume of retentate collected (liters) | 49.00 |
| c. Brix of retentate | 5.80 |
| d. Calculated soluble solids | 2.84 |
| d. Calculated % soluble solids of the input feed | 19.74 |
| e. Volume concentration factor (VCF) | 14.69 |
| IVB. Permeate (sugar and organic acid fraction) | |
| a. Volumes of permeate generated (liters) | 80.0 |
| b. Brix of permeate | 1.30 |
| c. Calculated soluble solids | 1.04 |
| d. Calculated % soluble solids of feed passed in permeate | 7.22 |
| e. Total % soluble solids removed in the permeate | 76.17 |
| V. Freeze-drying of Bioactive color retentate obtained from UF-DF process in III A | |
| Weight of rentate used for drying (grams) | 1012.20 |
| Weight of freeze dried bioactive cranberry powder obtained | 41.00 |
| % Dried yield | 4.05 |
| VI. Analysis of anthocyanins, phenolics, antioxidant capacity and other markers of bioactivity | |
| Total phenolics in the bioactive powder (g/100 g as Gallic acid equivalent) | 21.48 |
| Total Anthocyanins (g/100 g) | 9.121 |
| Total antioxidant capacity (ORAC value as micromol of Trolox/100 g) | 92,800 |
| Proanthocyanidins (g/100 g | 2.702 |

The volume of feedstock used in each of the examples, the initial Brix and the calculated soluble solids are indicated under "I. Feed," (I a-c). The operating parameters are shown under item II A pressure of 45 psi was used for cherry juice and blueberry juice, while 100 psi was used for cranberry.

The progress through the initial ultrafiltration step is reported at item III. In Examples 1 and 2, more than 85% of the soluble solids have passed through with the permeate. In the cranberry example 3, almost 70% are in the permeate. While the Brix of the retentate has increased in all of the examples, it is a function of the concentration of the retentate. The retentate volume at this point is well under 10% of the starting volume.

In Example 1, 71 liters of retentate from red tart cherry juice was collected in the ultrafiltration only step (III A. a). This retentate was recycled with diafiltration eight times, adding approximately 20 liters of water to the recycled retentate on each pass. Thus, 160 liters of water were added during the ultrafiltration-diafiltration step (IV A.a). In Example 2, wild blueberry juice, 37 liters of retentate (III.A.a) were ultimately diluted with an additional 120 liters of water during six passes of the ultrafiltration-diafiltration process (IV.A.a). In Example 3, 80 liters of cranberry juice retentate (III.A.a) were recirculated four times with 20 liter injections until a total of 80 liters of water had been used to dilute the retentate (IV.A.a). As a result of the diafiltration-ultrafiltration step, additional sugar has been eliminated from the retentate and passed into the permeate (IVA, b and c, compared to III A, b and c; or IV B e to III B d).

The resulting retentate quantities were freeze dried at 26° C. (V). The degree of concentration of phenolics can be seen by comparing the anti-oxidant capacity (ORAC Value in micromoles TE per 100 grams) of the concentrates obtained, as compared to the ORAC Values for the original fruit:

TABLE 1

Comparative data on Antioxidant values of Fruits and Freeze Dried Powder from UF-DF retentate color fraction.

| Fruit | Original ORAC Value (per 100 g)[1] | Freeze dried powders ORAC Value(per 100 g)[2] |
|---|---|---|
| Blueberries | 6552 | 389,700 |
| Red Tart Cherries | 2,033 | 374,450 |
| Cranberries | 9,584 | 92,800 |

[1]Source: USDA, 2007, except for Red Tart Cherries, for which the source is the Cherry Marketing Institute of Michigan.
[2]Source: Examples 1 to 3.

The total phenolics obtained in examples 1-3 comprise 40.79%, 36.08% and 21.48% of the freeze dried diafiltered retentate color fraction. The anthocyanins content of the Examples 1-3 are 9.27%, 14.19%, and 9.121%, respectively.

It is surprising that these quantities of bioactive phenolics, comprised of significant quantities of compounds having molecular weights well below the molecular cut-off of the ultra-filters used, have been retained in the retentate, and have not passed through with the sugars and food acids contained in the permeate.

Of course, it is understood that various changes and alterations can be made to the preferred embodiments disclosed herein without departing from the spirit of the invention as set forth in the appended claims.

The invention claimed is:

1. A method for physical separation and concentration of bioactive phenolics having molecular weights of less than 1,000 Daltons from fruits, berries and vegetables comprising: subjecting a fruit, berry or vegetable extract solution having a Brix of from about 1 to about 4 to ultrafiltration using an about 2,000-6,000 Dalton cutoff ultrafiltration membrane under a pressure of about 30-120 psi, and a temperature of about 80-110° F., followed by subjecting the resulting retentate to diafiltration-ultrafiltration with the co-injection of water, using an about 2,000-6,000 Dalton cutoff ultrafiltration membrane under a pressure of about 30-120 psi, and a temperature of about 80-110° F., and recovering the diafiltered retentate containing bioactive phenolics having molecular weights of less than 1,000 Daltons.

2. The method of claim 1 in which said ultrafiltration is conducted using an about 4,000-6,000 Dalton cutoff ultrafiltration membrane.

3. The method of claim 2 in which said ultrafiltration is conducted using an about 5,000 Dalton cutoff ultrafiltration membrane.

4. The method of claim 2 in which said diafiltration-ultrafiltration is conducted using the same ultrafiltration membrane as is used in said ultrafiltration.

5. The method of claim 2 in which said diafiltration-ultrafiltration is conducted using an about 2,000-4,000 Dalton cut-off ultrafiltration membrane.

6. The method of claim 5 in which said diafiltration-ultrafiltration is conducted using an about 3,000 Dalton cut-off ultrafiltration membrane.

7. The method of claim 2 in which both said ultrafiltration and said diafiltration are conducted at about 30-60 psi.

8. The method of claim 7 in which both said ultrafiltration and said diafiltration are conducted at about 45 psi.

9. The method of claim 2 in which both said ultrafiltration and said diafiltration are conducted at about 60-120 psi.

10. The method of claim 2 in which both said ultrafiltration and said diafiltration are conducted at about 100 psi.

11. The method of claim 5 in which the retentates are recirculated both during said ultrafiltration and during said diafiltration-ultrafiltration.

12. The method of claim 2 in which retentates are recirculated both during said ultrafiltration and during said diafiltration-ultrafiltration.

13. The method of claim 1 in which the retentates are recirculated both during said ultrafiltration and during said diafiltration-ultrafiltration.

14. The method of claim 5 in which both said ultrafiltration and said diafiltration are conducted at about 100-110° F.

15. The method of claim 2 in which both said ultrafiltration and said diafiltration are conducted at about 100-110° F.

16. The method of claim 1 in which both said ultrafiltration and said diafiltration are conducted at about 100-110° F.

17. The method of claim 5 in which said ultrafiltration is discontinued when the flow rate through said ultra-filter drops to less than about 15 liters per minute.

18. The method of claim 2 in which said ultrafiltration is discontinued when the flow rate through said ultra-filter drops to less than about 15 liters per minute.

19. The method of claim 1 in which said ultrafiltration is discontinued when the flow rate through said ultra-filter drops to less than about 4 liters per square meter of membrane area per hour or 4.0 LMH.

20. A method for separating and concentrating bioactive phenolics having molecular weights of less than 1,000 Daltons from fruits, berries and vegetables comprising: subjecting a fruit, berry or vegetable extract solution having a Brix of from about 1 to about 4 to ultrafiltration, with recirculation of the retentate, using an about 2,000-6,000 Dalton cutoff ultrafiltration membrane under a pressure of about 30-120 psi, and a temperature of about 80-110° F.; discontinuing said ultrafiltration when the flow rate of said extract and said recycled retentate through said ultrafiltration membrane drops to less than about 4 liters per square meter of membrane area per hour or 4.0 LMH, thereby creating an ultrafiltered retentate; followed by subjecting the ultrafiltered retentate to diafiltration-ultrafiltration by recirculating said ultrafiltered retentate, with the addition of water at a rate of about one quarter to about one half liter of water per liter of retentate, through an about 2,000-6,000 Dalton cutoff ultrafiltration membrane under a pressure of about 30-120 psi, and a temperature of about 80-110° F., until the total added water used is about 1 and ½ to about 3 times the volume of the ultrafiltered retentate; and recovering the diafiltered retentate containing bioactive phenolics having molecular weights of less than 1,000 Daltons.

21. The method of claim 20 in which said ultrafiltration is conducted using an about 4,000-6,000 Dalton cutoff ultrafiltration membrane.

22. The method of claim 21 in which said diafiltration-ultrafiltration is conducted using the same ultrafiltration membrane as is used in said ultrafiltration.

23. The method of claim 21 in which said diafiltration-ultrafiltration is conducted using an about 2,000-4,000 Dalton cut-off ultrafiltration membrane.

24. The method of claim 23 in which both said ultrafiltration and said diafiltration are conducted at about 30-60 psi.

25. The method of claim 24 in which the retentates are recirculated both during said ultrafiltration and during said diafiltration-ultrafiltration.

26. The method of claim 23 in which the retentates are recirculated both during said ultrafiltration and during said diafiltration-ultrafiltration.

27. The method of claim 20 in which the retentates are recirculated both during said ultrafiltration and during said diafiltration-ultrafiltration.

28. The method of claim 24 in which both said ultrafiltration and said diafiltration are conducted at about 100-110° F.

29. The method of claim 23 in which both said ultrafiltration and diafiltration are conducted at about 100-110° F.

30. The method of claim 20 in which both said ultrafiltration and said diafiltration are conducted at about 100-110° F.

* * * * *